United States Patent
Kurohara

(10) Patent No.: US 10,444,718 B2
(45) Date of Patent: Oct. 15, 2019

(54) PROGRAM GENERATOR HAVING FUNCTION OF OPTIMIZING MACHINING SEQUENCE

(71) Applicant: FANUC CORPORATION, Yamanashi (JP)

(72) Inventor: Yasuyuki Kurohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 15/612,180

(22) Filed: Jun. 2, 2017

(65) Prior Publication Data
US 2017/0357231 A1    Dec. 14, 2017

(30) Foreign Application Priority Data
Jun. 10, 2016 (JP) ................. 2016-116557

(51) Int. Cl.
*G05B 19/04* (2006.01)
*G05B 19/4093* (2006.01)

(52) U.S. Cl.
CPC ... *G05B 19/0405* (2013.01); *G05B 19/40938* (2013.01); *G05B 2219/32015* (2013.01); *G05B 2219/34418* (2013.01); *G05B 2219/35162* (2013.01); *Y02P 90/265* (2015.11)

(58) Field of Classification Search
CPC ...... G05B 19/0405; G05B 2219/32015; G05B 19/40938; G05B 2219/34418; G05B 2219/35162
USPC .................................................. 700/173, 174
See application file for complete search history.

(56) References Cited

U.S. PATENT DOCUMENTS

| 4,667,294 | A | 5/1987 | Shima et al. |
| 5,298,006 | A * | 3/1994 | Miyajima ............ G05B 19/408 483/1 |
| 8,362,392 | B2 * | 1/2013 | Elfizy .................... B25J 9/1664 219/121.67 |
| 9,703,915 | B2 * | 7/2017 | Garaas ................ G06F 17/5081 |
| 2003/0045948 | A1 | 3/2003 | Hwang |

FOREIGN PATENT DOCUMENTS

| EP | 0148273 A1 | 7/1985 |
| JP | H3-251341 A | 11/1991 |
| JP | H0899252 A | 4/1996 |

OTHER PUBLICATIONS

Extended European Search Report in EP Application No. 17171474.4, dated Oct. 26, 2017, 8pp.
Office Action in JP Application No. 2016-116557, dated Feb. 19, 2019, 3pp.

* cited by examiner

*Primary Examiner* — Chun Cao
(74) *Attorney, Agent, or Firm* — Hauptman Ham, LLP

(57) ABSTRACT

A program generator extracts at least one machining process from a machining program, analyzes the machining process, generates information regarding the machining process, gives the machining process a score based on the information regarding the machining process, and determines a sequence of the machining process based on the given score. The information regarding the machining process includes a machining shape to be formed by the machining process. The machining process is given a score based on the machining shape.

7 Claims, 11 Drawing Sheets

| MACHINING SHAPE CONDITIONS | EXAMPLES OF HOW TO DETERMINE A SCORE |
|---|---|
| MACHINING SHAPE BALANCE | SCORE INCREASES AS CLOSENESS TO SHAPE OF PERFECT CIRCLE INCREASES |
| MACHINING SHAPE SIZE | SCORE INCREASES AS SIZE OF SHAPE DECREASES |
| DISTANCE FROM JIGS | SCORE INCREASES AS DISTANCE FROM JIGS DECREASES |
| MACHINING SHAPE POSITION | SCORE DECREASES AS THE NUMBER OF CROSSED QUADRANTS OF WORKPIECE INCREASES |

FIG. 1

| MACHINING SHAPE CONDITIONS | EXAMPLES OF HOW TO DETERMINE A SCORE |
|---|---|
| MACHINING SHAPE BALANCE | SCORE INCREASES AS CLOSENESS TO SHAPE OF PERFECT CIRCLE INCREASES |
| MACHINING SHAPE SIZE | SCORE INCREASES AS SIZE OF SHAPE DECREASES |
| DISTANCE FROM JIGS | SCORE INCREASES AS DISTANCE FROM JIGS DECREASES |
| MACHINING SHAPE POSITION | SCORE DECREASES AS THE NUMBER OF CROSSED QUADRANTS OF WORKPIECE INCREASES |

FIG. 2

| MACHINING HISTORY CONDITIONS | EXAMPLES OF HOW TO DETERMINE A SCORE |
|---|---|
| POSITIONAL RELATIONSHIP WITH THE PRECEDING PROCESS | HIGHER SCORE IS GIVEN FOR QUADRANT DIFFERENT FROM THAT OF PRECEEDING MACHINING POSITION |
| POSITIONAL RELATIONSHIP WITH THE SECOND PRECEDING PROCESS | HIGHER SCORE IS GIVEN FOR QUADRANT DIFFERENT FROM THAT OF SECOND PRECEEDING MACHINING POSITION |

MACHINING SHAPE
WITH HIGH SCORE

MACHINING SHAPE
WITH LOW SCORE

CALCULATE RATIO OF
AREA OF MACHINING
SHAPE TO AREA OF
CIRCUMSCRIBED CIRCLE

CALCULATE RADIUS
DIFFERENCE BETWEEN
CIRCUMSCRIBED CIRCLE AND
INSCRIBED CIRCLE OR RATIO
OF AREA OF INSCRIBED
CIRCLE TO AREA OF
CIRCUMSCRIBED CIRCLE

MACHINING SHAPE
WITH HIGH SCORE

MACHINING SHAPE
WITH LOW SCORE

MACHINING SHAPE
WITH HIGH SCORE

MACHINING SHAPE
WITH LOW SCORE

| MACHINING PROCESS | SHAPE | SIZE | DISTANCE | QUADRANT | TOTAL |
|---|---|---|---|---|---|
| A | 10 | 10 | 10 | 10 | 40 |
| B | 8 | 9 | 1 | 10 | 28 |
| C | 10 | 10 | 9 | 10 | 39 |
| D | 10 | 10 | 4 | 10 | 34 |
| E | 10 | 10 | 8 | 10 | 38 |
| F | 8 | 9 | 10 | 10 | 37 |

| MACHINING PROCESS | SHAPE | SIZE | DISTANCE | QUADRANT | POSITION 1 | TOTAL |
|---|---|---|---|---|---|---|
| A | 10 | 10 | 10 | 10 | - | - |
| B | 8 | 9 | 1 | 10 | 1 | 29 |
| C | 10 | 10 | 9 | 10 | 6 | 45 |
| D | 10 | 10 | 4 | 10 | 10 | 44 |
| E | 10 | 10 | 8 | 10 | 6 | 44 |
| F | 8 | 9 | 10 | 10 | 10 | 47 |

| MACHINING PROCESS | SHAPE | SIZE | DISTANCE | QUADRANT | POSITION 1 | POSITION 2 | TOTAL |
|---|---|---|---|---|---|---|---|
| A | 10 | 10 | 10 | 10 | - | - | - |
| B | 8 | 9 | 1 | 10 | 10 | 1 | 39 |
| C | 10 | 10 | 9 | 10 | 6 | 6 | 51 |
| D | 10 | 10 | 4 | 10 | 1 | 10 | 45 |
| E | 10 | 10 | 8 | 10 | 6 | 6 | 50 |
| F | 8 | 9 | 10 | 10 | - | - | - |

MACHINING SEQUENCE

PROGRAM GENERATOR HAVING FUNCTION OF OPTIMIZING MACHINING SEQUENCE

RELATED APPLICATIONS

The present application claims priority to Japanese Application Number 2016-116557 filed Jun. 10, 2016, the disclosure of which is hereby incorporated by reference herein in its entirety.

BACKGROUND OF THE INVENTION

1. Field of the Invention

The present invention relates to a program generator, and particularly to a program generator having the function of optimizing a machining sequence.

2. Description of the Related Art

Machine tools, such as wire-cut electrical discharge machining machines, laser machines, and punch presses, machine a workpiece such that a hole is formed therein. Such machine tools have a problem that the machining decreases the strength of the machined portion of the workpiece to produce deflection due to the self-weight of the workpiece. For example, in the case where hole drilling such as shown in FIG. 15 is performed on a workpiece from the right, the material strengths of machined portions decrease, and there occurs a problem that the entire workpiece is likely to deflect. Such deflection deforms the workpiece and greatly influences machining accuracy. Moreover, machining such as laser machining and punch press machining increases the temperature of a machined portion, and may thermally deform the workpiece if the same portion is continuously machined. An operator must determine a machining sequence in consideration of the above-described issues.

Prior art techniques relating to the determination of a machining sequence include, for example, a method disclosed in Japanese Patent Application Laid-Open No. 08-099252 which generates a positioning path for hole drilling in a CAD/CAM system. To reduce the thermal deformation of a workpiece, this method determines a machining sequence (for example, P→Q→R→ . . . ) such that an unperformed machining process at a position farthest away from the position on the workpiece at which the previous machining process has been performed is selected as the next machining process as shown in FIG. 16, thus preventing a predetermined region on the workpiece from being consecutively machined.

However, the above-described technique disclosed in Japanese Patent Application Laid-Open No. 08-099252 does not take into account a machining shape to be formed by each machining process when determining the sequence of execution of machining processes. Accordingly, in the case where a plurality of machining processes having different machining shapes are performed on one workpiece in a mixed manner, the plurality of machining processes may not be performed in an optimum machining sequence, and this may cause a problem that deflection or thermal deformation occur. For example, in the case of a large machining shape, even if the position of center of gravity of a machining shape formed in a machining process is farthest away from the position of machining in the previous machining process, determining the next machining process based on the previous machining process may result in machining at a position near the previous machining.

Moreover, the above-described technique disclosed in Japanese Patent Application Laid-Open No. 08-099252 does not take into account a machining history when determining a machining sequence, and therefore machining may be performed at a position near the position of the second or third previous machining. Accordingly, there is also a problem that deflection or thermal deformation may be likely to occur.

SUMMARY OF THE INVENTION

Accordingly, an object of the present invention to provide a program generator having the function of determining an optimum machining sequence considering machining shapes and machining histories.

The program generator of the present invention generates a machining program for performing a plurality of machining processes on one workpiece. The program generator gives each machining process a score based on conditions such as a machining shape to be formed by the machining process and a machining history, and generates a machining program which performs the machining processes in descending order of score.

The present invention relates to a program generator for controlling a machine tool based on a machining program. The program generator includes: a machining process analysis unit for extracting at least one machining process from the machining program, analyzing the at least one machining process, and generating information regarding the machining process; a machining process scoring unit for giving the machining process a score based on the information regarding the machining process; and a machining sequence determination unit for determining a sequence of the machining process based on the score given to the machining process by the machining process scoring unit. The information regarding the machining process includes a machining shape to be formed by the machining process. The machining process scoring unit gives the machining process the score based on the machining shape to be formed by the machining process.

The machining process scoring unit may give the machining process the score based on the information regarding the machining process and information regarding any one of a previous machining process and a machining process earlier than the previous machining process, the previous machining process and the machining process earlier than the previous machining process being determined by the machining sequence determination unit.

The program generator may further include a machining program generation unit for generating a machining program based on the sequence of the machining process determined by the machining sequence determination unit.

The present invention enables a machining program having an optimum machining sequence to be generated. Accordingly, the present invention can greatly reduce the time required to generate a machining program taking into account deflection and thermal deformation, and contributes to the improvement of work efficiency and productivity. Moreover, the present invention allows an inexperienced operator to create an optimum machining program.

BRIEF DESCRIPTION OF THE DRAWINGS

FIG. 1 is a view showing examples of conditions of a machining shape to be formed by a machining process.

FIG. 2 is a view showing examples of conditions of a machining history.

DETAILED DESCRIPTION OF THE PREFERRED EMBODIMENTS

A program generator according to one embodiment of the present invention has the function of generating a machining program for performing a plurality of machining processes on one workpiece. The program generator gives each machining process a score based on conditions such as a machining shape to be formed by the machining process and a machining history, and then generates a machining program for performing the machining processes in descending order of score. It should be noted that in this specification, a machining process means a series of command blocks for forming one machining shape in a workpiece.

The program generator according to one embodiment of the present invention gives lower scores to machining processes performing machining that is likely to cause deflection or thermal deformation, and gives higher scores to machining processes performing machining that is less likely to cause deflection or thermal deformation. As examples of how to determine a score regarding deflection, examples of conditions of a machining shape to be formed by a machining process are shown in FIG. 1, and examples of conditions of a machining history are shown in FIG. 2. It should be noted that conditions regarding deflection can be added or modified by an operator.

First, how to determine scores based on machining shape conditions will be described with reference to FIG. 1.

Figure 3A:
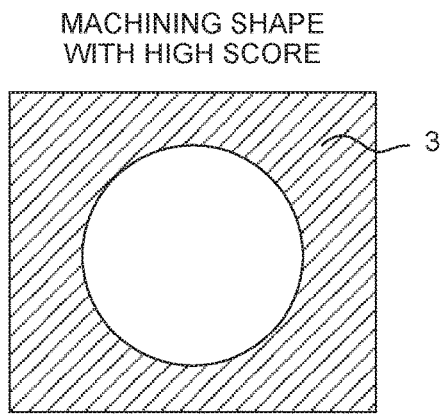
FIGS. 3A and 3B are diagrams for explaining the outline of how to determine a score for the condition "machining shape balance", which is one of the "machining shape conditions" in FIG. 1.
Figure 3B:
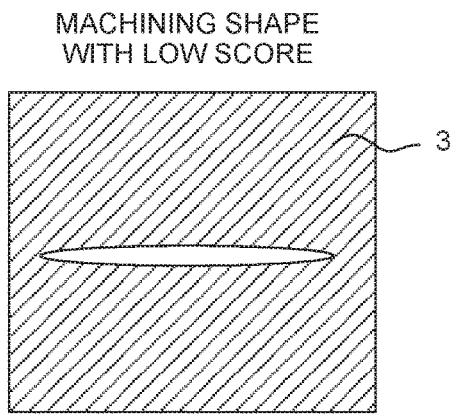

"machining shape balance", which is one of machining shape conditions, is a condition for which a score is determined based on an overall balance of a machining shape to be formed by a machining process. Generally, as a machining shape to be formed approaches closely to the shape of a perfect circle, a score increases because the shape has a better balance and deflection is less likely to occur (FIG. 3A). On the other hand, as the difference between a machining shape to be formed and the shape of a perfect circle increases, a score decreases because deflection is more likely to occur (FIG. 3B).

Figure 4A:
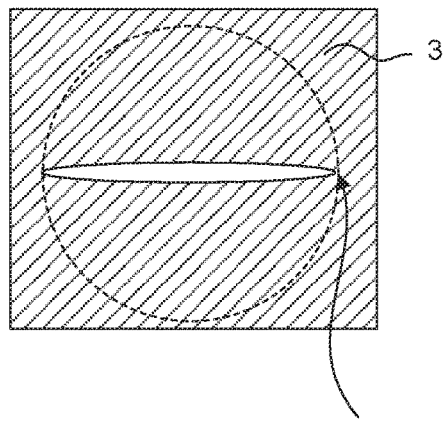
FIGS. 4A and 4B are diagrams showing examples of how to calculate a score for the condition "machining shape balance".
Figure 4B:
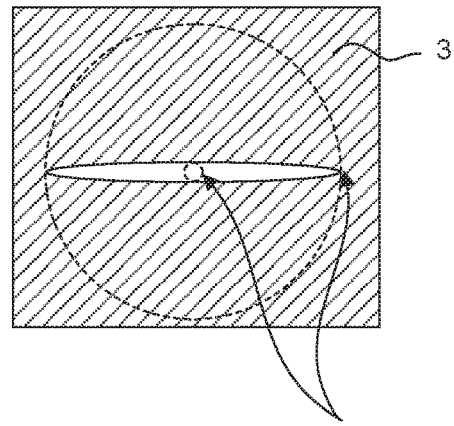

For the condition "machining shape balance", as a measure of the closeness to the shape of a perfect circle, for example, as shown in FIG. 4A, a score may be determined according to the ratio of the area of a shape to the area of the circumscribed circle thereof. Alternatively, as shown in FIG. 4B, a score may be determined according to the radius difference between the circumscribed circle and the inscribed circle of a machining shape or the ratio of the area of the inscribed circle to the area of the circumscribed circle. A perfect circle is given 10 points, and a score decreases as the closeness to the shape of a perfect circle decreases.

Figure 5A:
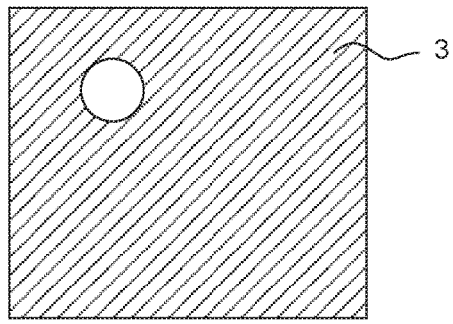
FIGS. 5A and 5B are diagrams for explaining the outline of how to determine a score for the condition "machining shape size", which is one of the "machining shape conditions" in FIG. 1.
Figure 5B:
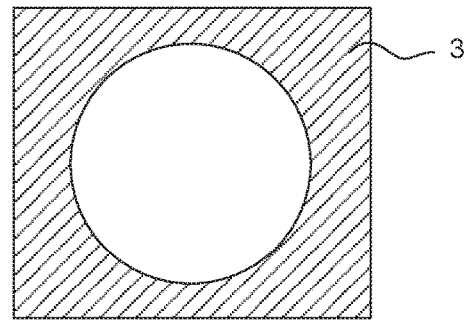

"machining shape size", which is one of machining shape conditions, is a condition for which a score is determined based on the size of a machining shape to be formed by a machining process. Generally, a smaller machining shape to be formed is given a higher score because a smaller machining shape is less likely to cause deflection (FIG. 5A). On the other hand, a larger machining shape to be formed is given a lower score because a larger machining shape is more likely to cause deflection (FIG. 5B). As an example of how to determine a score for the condition "machining shape size", a score may be calculated according to the following equation (1), with the maximum score set to 10:

$$\text{Score}=10\times\{1-(\text{area of shape/area of entire workpiece})\} \quad (1)$$

Figure 6A:
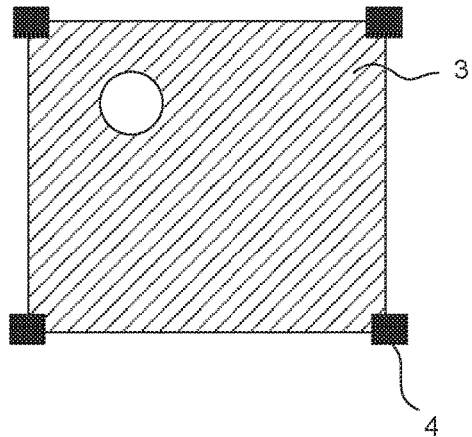
FIGS. 6A and 6B are diagrams for explaining the outline of how to determine a score for the condition "distance from jigs", which is one of the "machining shape conditions" in FIG. 1.
Figure 6B:
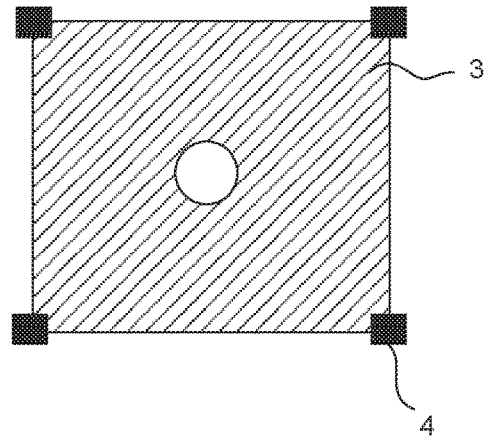

"distance from jigs", which is one of machining shape conditions, is a condition for which a score is determined according to the degree of how far a position at which a machining shape is formed by a machining process is away from jigs for supporting a workpiece. For example, in the case where jigs 4 support four corners of a workpiece 3, generally, positions nearer the jigs 4, that is, farther from the center of the workpiece 3 are given higher scores because such positions are less likely to be subjected to loads from surroundings and the workpiece 3 is less likely to deflect (FIG. 6A). On the other hand, positions nearer the center are given lower scores because such positions are more likely to be subjected to loads from surroundings and the workpiece 3 is more likely to deflect (FIG. 6B).

As how to determine a score for the condition "distance from jigs", for example, a machining process of forming a machining shape at a position nearest the center of the workpiece as seen from the entire workpiece may be given 1 point, and a machining process of forming a machining shape at a farthest position may be given 10 points. For other machining processes, scores may be calculated according to the area proportional distribution between the machining shape to be formed at the position nearest the center of the workpiece as seen from the entire workpiece and the machining shape to be formed at the position farthest away from the center of the workpiece as seen from the entire workpiece.

Figure 7A:
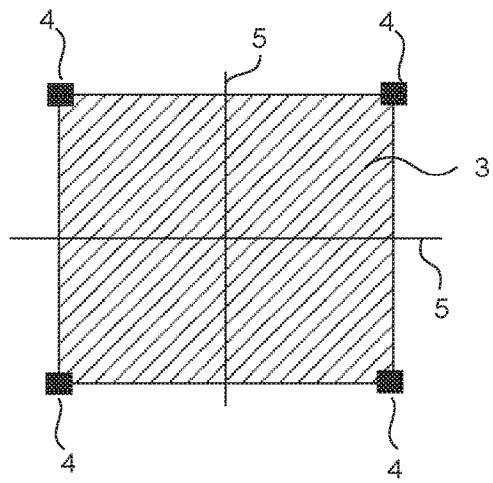
FIGS. 7A and 7B are diagrams for explaining "intermediate lines", which divide a workpiece into quadrants.
Figure 7B:
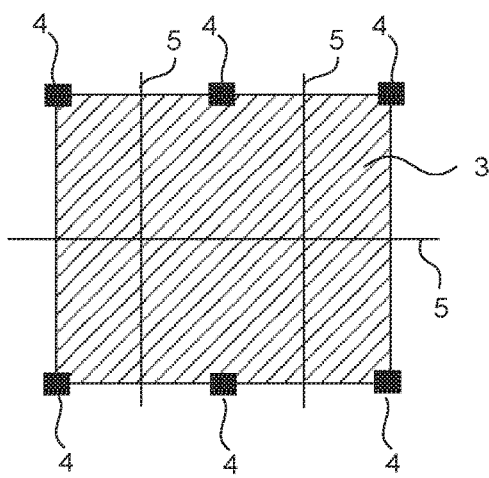

"machining shape position", which is one of machining shape conditions, is a condition for which a score is determined according to whether or not a machining shape to be formed crosses an intermediate line or intermediate lines of a workpiece. In this example, an "intermediate line" means a line between adjacent jigs among the jigs supporting a workpiece; in other words, intermediate lines are lines dividing the workpiece into four quadrants. For example, as shown in FIG. 7A, in the case where the jigs 4 support the four corners of the workpiece 3, one horizontal line dividing the middle of the workpiece 3 and one vertical line dividing the middle of the workpiece 3 are "intermediate lines 5". Meanwhile, as shown in FIG. 7B, in the case where the four corners of the workpiece 3 and center portions of the upper end and the lower end of the workpiece 3 are supported by jigs 4, one horizontal line dividing the middle of the workpiece 3 and two vertical lines dividing the workpiece 3 are "intermediate lines 5".

Figure 8A:
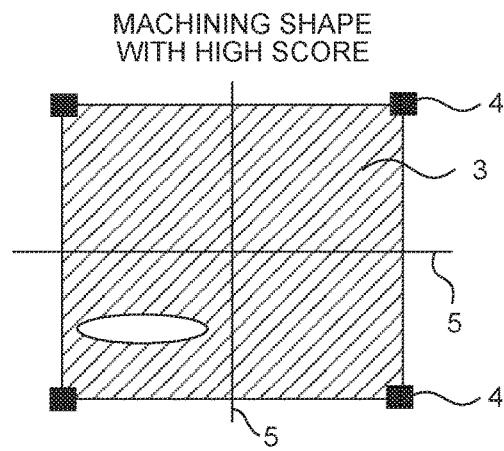
FIGS. 8A and 8B are diagrams for explaining the outline of how to determine a score for the condition "machining shape position", which is one of the "machining shape conditions" in FIG. 1.
Figure 8B:
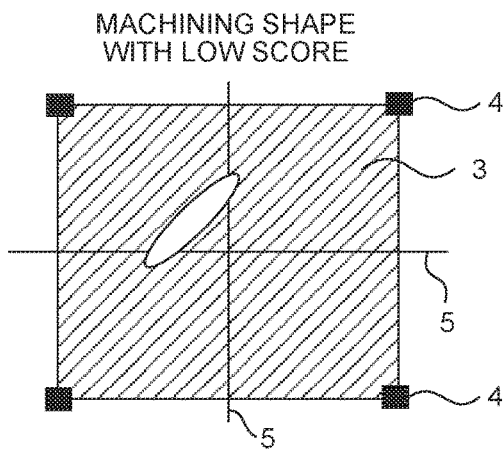

Generally, in the case where a machining shape to be formed does not cross such an intermediate line, a higher score is given thereto because the directions of loads from surroundings during the machining of the machining shape do not change (FIG. 8A). On the other hand, in the case where a machining shape to be formed crosses an intermediate line 5 or intermediate lines 5, a lower score is given thereto because the directions of loads from surroundings during the machining of the machining shape change and deflection is more likely to occur (FIG. 8B).

As an example of how to determine a score for the condition "machining shape position", a machining shape which does not cross an intermediate line 5 may be given 10 points, a machining shape which crosses one intermediate line 5 may be given 8 points, a machining shape which crosses two intermediate lines 5 may be given 5 points, a machining shape which crosses three intermediate lines may be given 3 points, and a machining shape which crosses four intermediate lines may be given 1 point.

Figures 9A, 9B:
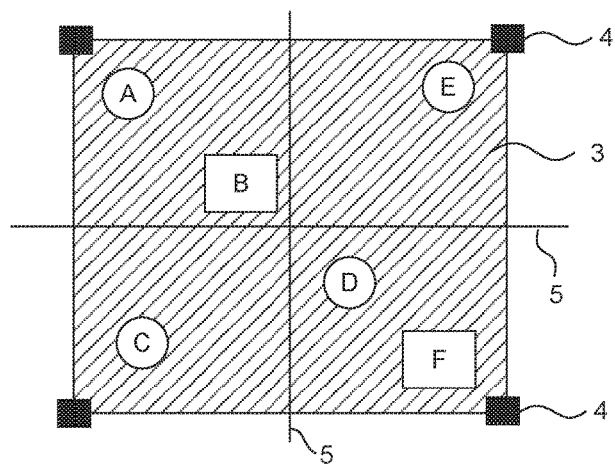
FIGS. 9A and 9B are views for explaining how to select a first machining process when the sequence of a plurality of machining processes to be performed on one workpiece is determined.

The program generator according to one embodiment of the present invention gives, for example, a machining shape to be formed by each of a plurality of machining processes to be performed on one workpiece a score for each of the above-described conditions, finds a total score for each machining process by adding scores, and determines the sequence of execution of the machining processes based on the found total scores. For example, in the case where machining such as shown in FIG. 9A is performed on one workpiece (machining processes A to F), scores are determined for respective conditions and summed for each machining process to obtain total scores as shown in FIG. 9B. Then, based on the determined total scores, machining process A (total score 40), which is a machining process having a highest total score, is selected as a first machining process.

Figures 10A, 10B:
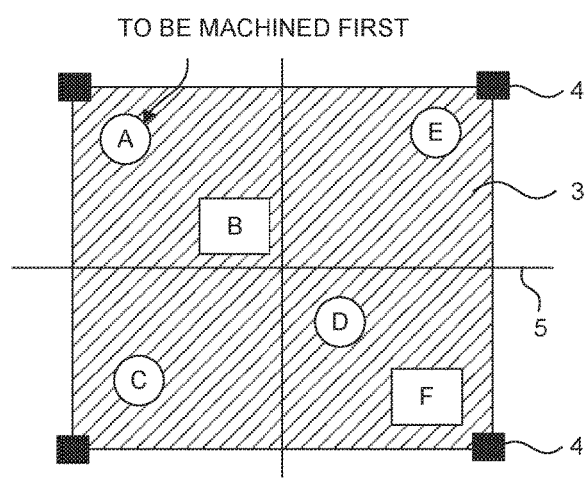
FIGS. 10A and 10B are views for explaining how to select a second machining process after the first machining process is selected.

When selecting a second or later machining process, the program generator according to one embodiment of the present invention further takes into account scores based on the machining history condition "positional relationship with the preceding process" in addition to the total scores determined for the above-described machining shape conditions. For example, when selecting a second machining process, the program generator of the present invention adds, to the total score of each machining process determined for the machining shape conditions, a score determined for the condition "positional relationship with the preceding process", which is a condition regarding the position of the machining shape to be formed by the machining process relative to the position of the machining shape to be formed by the first machining process. Then, based on the results of calculation, the program generator selects a second machining process. As an example of how to determine a score for the condition "positional relationship with the preceding process", which is a machining history condition, a machining process may be given 1 point if the position of the machining shape to be formed by this machining process is in the same quadrant as the position of the machining shape to be formed by the previous machining process, given 6 points if the position of the machining shape to be formed by this machining process is in a quadrant next to that of the position of the machining shape to be formed by the previous machining process, and given 10 points if the position of the machining shape to be formed by this machining process is in a quadrant farther away from that of the position of the machining shape to be formed by the previous machining process. At this time, as shown in FIG. 10A, if machining process A is selected as a first machining process, when a second machining process is selected, scores determined for the condition "positional relationship with the preceding process", which is a machining history condition, are further added to the total scores determined for machining shape conditions (FIG. 10B), and a machining process having a highest score among the results of calculation (in FIG. 10A, machining process F, which is a machining process having a highest score (47 points)) is selected.

Figures 11A, 11B:
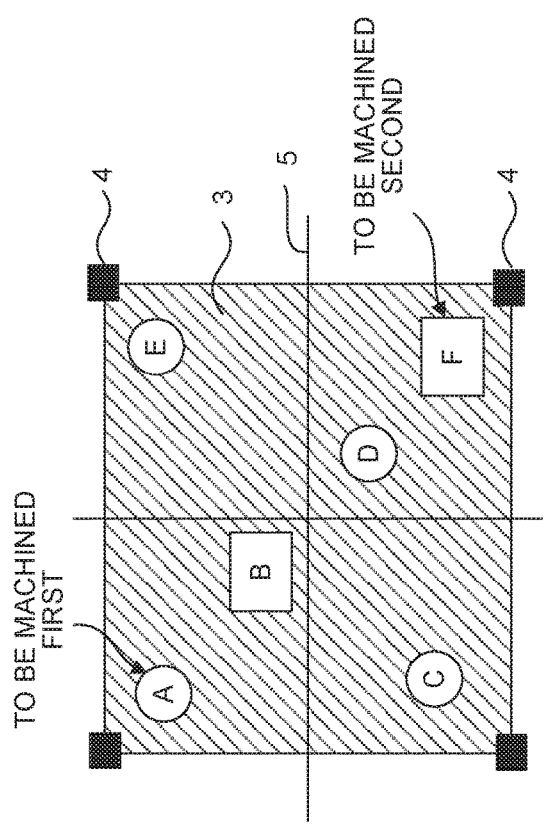
FIGS. 11A and 11B are views for explaining how to select a third machining process after the second machining process is selected.

Further, when selecting a third or later machining process, the program generator according to one embodiment of the present invention further takes into account scores determined based on the machining history condition "positional relationship with the second preceding process" in addition to the total scores determined for the above-described machining shape conditions and the scores determined based on the machining history condition "positional relationship with the preceding process". For example, when selecting a third machining process, the program generator of the present invention adds, to the total score of each machining process determined for the machining shape conditions, a score determined for the condition "positional relationship with the preceding process", which is a condition regarding the position of the machining shape to be formed by the machining process as viewed from the position of the machining shape to be formed by the second machining process and a score determined for the condition "positional relationship with the second preceding process", which is a condition regarding the position of the machining shape to be formed by the machining process as viewed from the position of the machining shape to be formed by the first machining process. Then, based on the results of calculation, the program generator selects a third machining process. As an example of how to determine a score for the condition "positional relationship with the second preceding process", which is a machining history condition, a machining process may be given 1 point if the position of the machining shape to be formed by this machining process is in the same quadrant as the position of the machining shape to be formed by the second previous machining process, given 6 points if the position of the machining shape to be formed by this machining process is in a quadrant next to that of the position of the machining shape to be formed by the second previous machining process, and given 10 points if the position of the machining shape to be formed by this machining process is in a quadrant farther away from that of the position of the machining shape to be formed by the second previous machining process. At this time, as shown in FIG. 11A, if machining process A is selected as a first machining process and machining process F is selected as a second machining process, when a third machining process is selected, scores determined for the conditions "positional relationship with the preceding process" and "positional relationship with the second preceding process", which are machining history conditions, are further added to the total scores determined for machining shape conditions (FIG. 11B), and a machining process having a highest score among the results of calculation (in FIGS. 11A and 11B, machining process C, which is a machining process having a highest score (51 points)) is selected.

The program generator according to one embodiment of the present invention determines the sequence of execution of machining processes contained in a machining program by repeating the above-described procedure, and generates a machining program in which the machining processes are arranged according to the determined sequence.

The configuration of the program generator according to one embodiment of the present invention will be described below.

Figure 12:
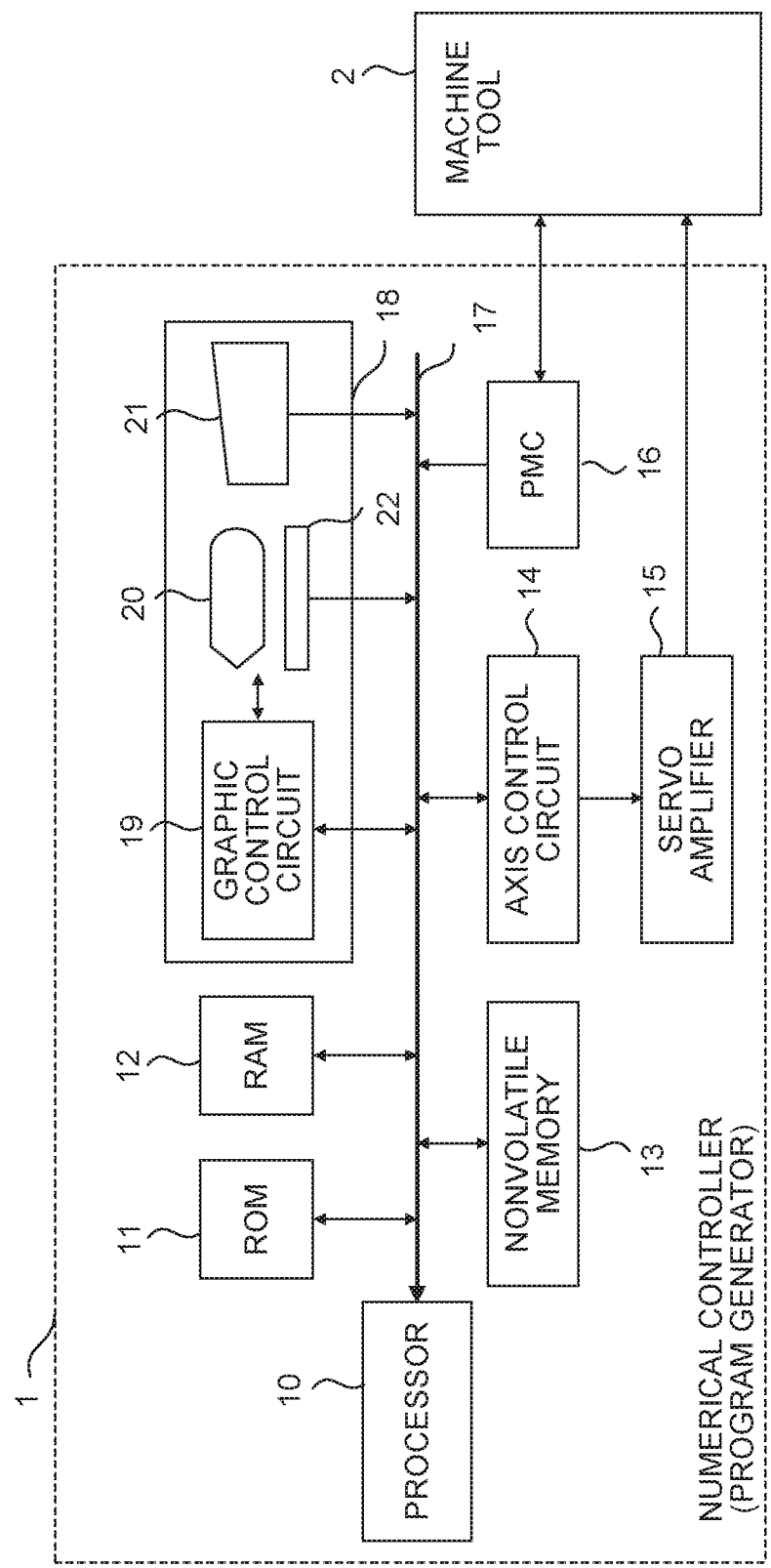
FIG. 12 is a hardware configuration diagram showing a principal part of a program generator according to one embodiment of the present invention.

FIG. 12 is a hardware configuration diagram showing a principal part of the program generator according to one embodiment of the present invention which is configured as a numerical controller. The numerical controller (program generator) 1 is configured such that the processor 10 serves as a central component. The processor 10 controls the entire numerical controller 1 according to a system program stored in ROM 11. This ROM 11 may be EPROM or EEPROM.

RAM 12 may be DRAM or the like, and stores temporary data such as computational data, display data, and input/output signals. Nonvolatile memory 13 may be CMOS or SRAM backed up by a battery (not shown), and stores parameters, machining programs, tool compensation data, and the like which should be retained even after the power is turned off.

An LCD/MDI unit 18 is disposed on a front face of the numerical controller 1 or at the same position as a machine control panel, and is used to display data and graphics, input data, and operate the numerical controller 1. A graphic control circuit 19 converts digital signals such as numerical data and graphic data to raster signals for display, sends the raster signals to a display device 20. The display device 20 displays these numerals and graphics. The display device 20 is typically a liquid crystal display device.

A keyboard 21 includes numeric keys, symbolic keys, alphabetic keys, and function keys, and is used to generate and edit machining programs and operate the numerical controller.

A touch panel 22 is overlaid on the screen of the display device 20, and has the function of sensing operator's actions such as touching to the screen and dragging.

An axis control circuit 14 receives an axis movement command from the processor 10 and outputs the axis movement command to a servo amplifier 15. The servo amplifier 15 amplifies this movement command, drives a servo motor connected to the machine tool 2, and controls the relative motion between a tool of the machine tool 2 and a workpiece. It should be noted that FIG. 12 shows components for one axis, but an axis control circuit 14 and a servo amplifier 15 are provided for each of axes of servo motors.

A programmable machine controller (PMC) 16 receives signals such as M (auxiliary) function signals, S (spindle speed control) function signals, and T (tool selection) function signals from the processor 10 through a bus 17. Then, the PMC 16 processes these signals using a sequence program, and outputs output signals to control pneumatic devices, hydraulic devices, electromagnetic actuators, and the like in the machine tool 2. Moreover, upon receiving various signals such as button signals and switch signals of the machine control panel in the machine tool 2, the PMC 16 performs sequencing, and transfers necessary input signals to the processor 10 through the bus 17.

It should be noted that in FIG. 12, a spindle motor control circuit, a spindle motor amplifier, and the like are omitted.

Figure 13:
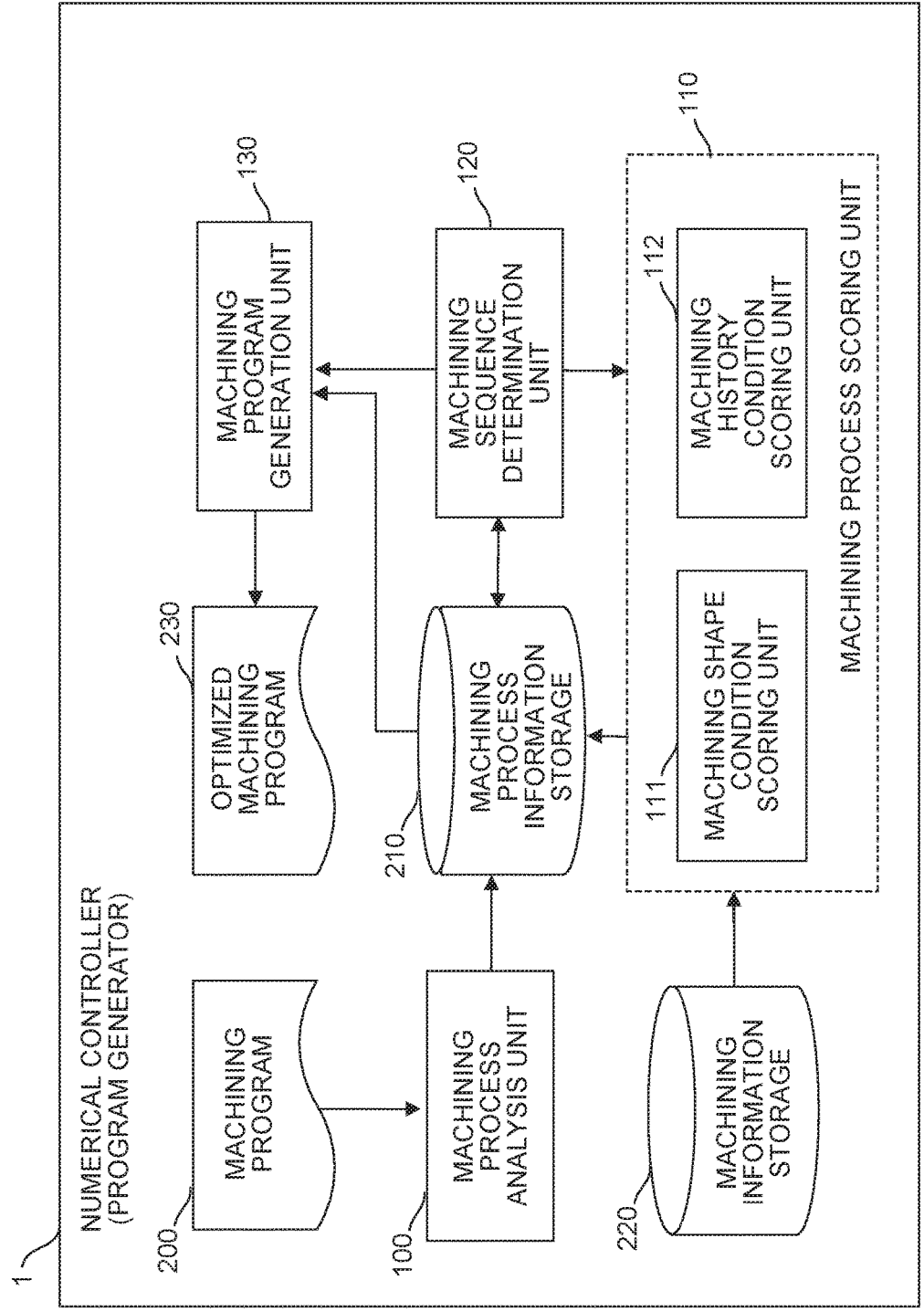
FIG. 13 is a functional block diagram schematically showing the program generator according to one embodiment of the present invention.

FIG. 13 is a functional block diagram schematically showing the above-described function regarding the determination of the sequence of machining processes which is implemented as a system program in the numerical controller 1 shown in FIG. 12. Each functional means shown in FIG. 13 is implemented by the processor 10 shown in FIG. 12 executing the system program and providing each function. The numerical controller 1 of this embodiment includes a machining process analysis unit 100, a machining process scoring unit 110, a machining sequence determination unit 120, and a machining program generation unit 130.

The machining process analysis unit 100 reads out and analyzes a machining program 200 stored in nonvolatile memory 13 (not shown), extracts a plurality of machining processes contained in the machining program, generates machining process information such as machining shapes to be machined by the extracted machining processes, the sizes of the machining shapes, and machining positions, and stores the generated machining process information in a machining process information storage 210 in association with the machining processes. The machining process analysis unit 100 may extract machining processes from the machining program 200 and generate machining process information by executing a general simulation process, or may extract machining processes from the machining program 200 and generate machining process information based on an operation instruction from an operator.

The machining process scoring unit 110 gives a score to each machining process stored in the machining process information storage 210 using the above-described method by the machining process analysis unit 100, based on the machining process information on the plurality of machining processes which is stored in the machining process information storage 210 and machining information (information regarding the shape of a workpiece before machining, material, installation position, jig positions, and the like) pre-stored in a machining information storage 220, and stores the score in the machining process information storage 210 in association with the machining process. The machining process scoring unit 110 includes a machining shape condition scoring unit 111 which gives a machining process a score based on machining shape conditions and a machining history condition scoring unit 112 which gives a machining process a score based on machining history conditions. The machining shape condition scoring unit 111 gives each machining process a score after the machining process analysis unit 100 stores machining process information in the machining process information storage 210. Meanwhile, the machining history condition scoring unit 112 gives each machining process a score every time the machining sequence determination unit 120 selects a machining process for each position in the sequence as described later.

The machining sequence determination unit 120 finds a total score for each machining process stored in the machining process information storage 210 by adding scores given by the machining process scoring unit 110, determines the sequence of execution of the machining processes based on the found total scores, and stores positions in the determined sequence in the machining process information storage 210 in association with the respective machining processes. The machining sequence determination unit 120 determines the sequence of machining processes by first selecting a machining process to be performed first and, every time a machining process is selected for each position in the sequence, instructs the machining history condition scoring unit 112 to give (recalculate) scores to machining processes based on machining history conditions. After machining sequence is determined for each of the machining processes, the machining sequence determination unit 120 instructs the machining program generation unit 130 to generate a machining program.

Upon receiving an instruction from the machining sequence determination unit 120, the machining program generation unit 130 generates a machining program for performing the machining processes stored in the machining process information storage 210 in the sequence determined by the machining sequence determination unit 120, and stores the generated machining program in nonvolatile memory 13 (not shown) as an optimized machining program 230. The machining program generation unit 130 may display the optimized machining program 230 on the LCD/MDI unit 18.

Figure 14:
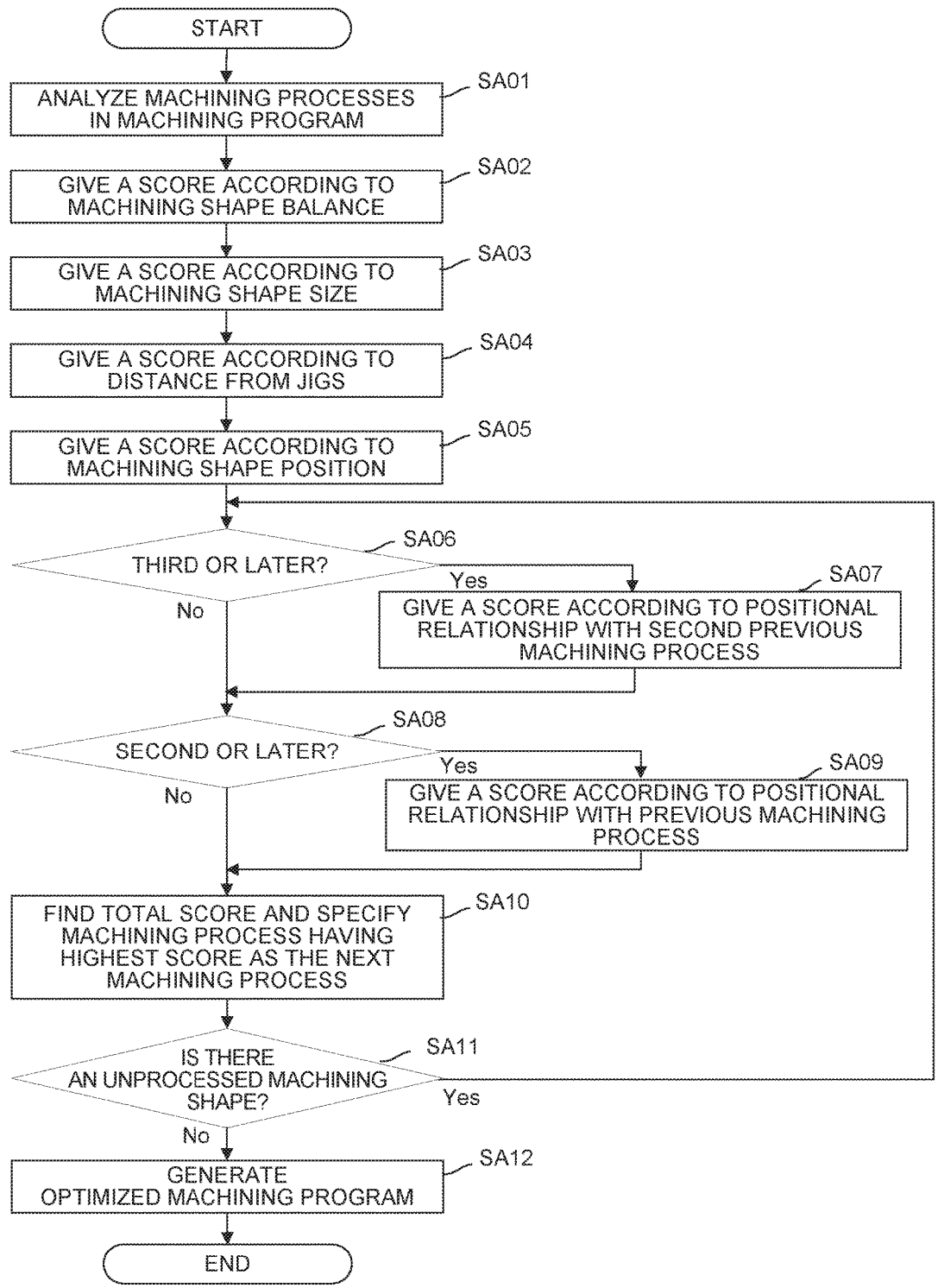
FIG. 14 is a flowchart showing the flow of a process executed on the program generator in FIG. 13.
Figure 15:
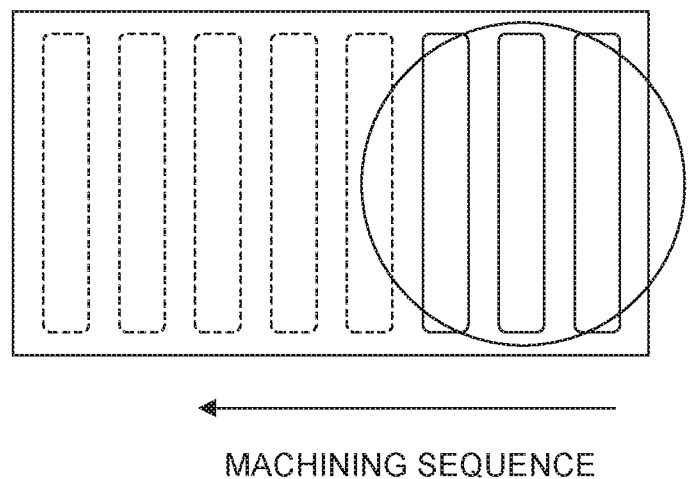
FIG. 15 is a diagram for explaining a problem occurring in the case where a plurality of hole drilling operations are performed on one workpiece.
Figure 16:
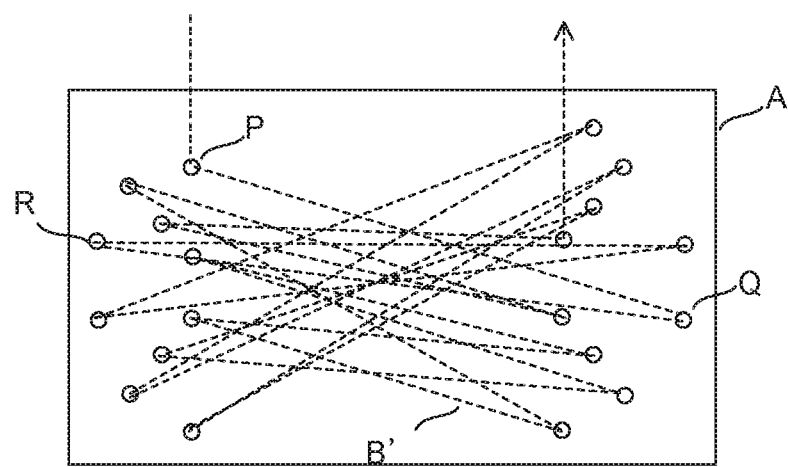
FIG. 16 is a diagram for explaining prior art hole drilling performed on one workpiece.

FIG. 14 is a flowchart schematically showing the flow of a process executed on the numerical controller 1 shown in FIG. 13.

[Step SA01] The machining process analysis unit 100 reads out and analyzes the machining program 200, extracts a plurality of machining processes contained in the machining program 200, generates information regarding the extracted machining processes, and stores the generated machining process information in the machining process information storage 210.

[Step SA02] The machining shape condition scoring unit 111 gives each machining process stored in step SA01 a score based on the balance of a machining shape to be formed by the machining process, and stores the score in the machining process information storage 210.

[Step SA03] The machining shape condition scoring unit 111 gives each machining process stored in step SA01 a score based on the size of the machining shape to be formed by the machining process, and stores the score in the machining process information storage 210.

[Step SA04] The machining shape condition scoring unit 111 gives each machining process stored in step SA01 a score based on the distance of the machining shape to be formed by the machining process from jigs on a workpiece, and stores the score in the machining process information storage 210.

[Step SA05] The machining shape condition scoring unit 111 gives each machining process stored in step SA01 a score based on the position on the workpiece of the machining shape to be formed by the machining process (whether or not the machining shape crosses a quadrant), and stores the score in the machining process information storage 210.

[Step SA06] The machining sequence determination unit 120 determines whether or not a machining process which the machining sequence determination unit 120 is about to select is a third or later machining process in the sequence of execution of the machining processes stored in the machining process information storage 210. If the machining sequence determination unit 120 is about to select a third or later machining process, the processing proceeds to step SA07; otherwise, the processing proceeds to step SA08.

[Step SA07] The machining sequence determination unit 120 instructs the machining history condition scoring unit 112 to give each machining process stored in the machining process information storage 210 a score based on the position of the machining shape to be formed by the machining process as viewed from the position of the machining shape to be formed by the second previous machining process, and stores the score in the machining process information storage 210.

[Step SA08] The machining sequence determination unit 120 determines whether or not a machining process which the machining sequence determination unit 120 is about to select is a second or later machining process in the sequence of execution of the machining processes stored in the machining process information storage 210. If the machining sequence determination unit 120 is about to select a second or later machining process, the processing proceeds to step SA09; otherwise, the processing proceeds to step SA10.

[Step SA09] The machining sequence determination unit 120 instructs the machining history condition scoring unit 112 to give each machining process stored in the machining process information storage 210 a score based on the position of the machining shape to be formed by the machining process as viewed from the position of the machining shape to be formed by the previous machining process, and stores the score in the machining process information storage 210.

[Step SA10] The machining sequence determination unit 120 finds a total score for each machining process by adding the scores given to the machining process stored in the machining process information storage 210, and specifies the machining process having the highest total score among the found total scores as a machining process to be performed next.

[Step SA11] The machining sequence determination unit 120 determines whether or not there is a machining process for which a position in the sequence has not been determined yet among the machining processes stored in the machining process information storage 210. If there is a machining process for which a sequence has not been determined yet, the processing proceeds to step SA06; otherwise, the processing proceeds to step SA12.

[Step SA12] The machining program generation unit 130 generates an optimized machining program 230 according to the sequence of the machining processes determined by steps SA06 to SA11, outputs the optimized machining program 230, and the processing is ended.

The above-described configuration enables a machining program having an optimum machining sequence to be generated. Accordingly, the time required to generate a machining program considering deflection and thermal deformation can be greatly reduced. Thus, the present invention contributes to the improvement of work efficiency and productivity, and allows an inexperienced operator to create an optimum machining program.

While embodiments of the present invention have been described above, the present invention is not limited to the above-described embodiments as examples, and can be implemented in various aspects by making appropriate modifications thereto.

For example, in the above-described embodiment, an example is shown for the case where a program generator of the present invention which determines the sequence of machining processes and generates an optimized machining program is configured as a numerical controller. However, the same program generator of the present invention may be configured as a machining program simulation apparatus or a personal computer.

The invention claimed is:

1. A program generator for controlling a machine tool based on a machining program, the program generator comprising:
 a machining process analysis unit configured to extract at least one machining process from the machining program, analyze the at least one machining process, and generate information regarding the machining process;
 a machining process scoring unit configured to give the machining process a score based on the information regarding the machining process; and
 a machining sequence determination unit configured to determine a sequence of the machining process based on the score given to the machining process by the machining process scoring unit,
 wherein the machine tool is configured to perform the machining process on a workpiece in the sequence based on the score,
 the information regarding the machining process includes a machining shape to be formed by the machining process, and
 the machining process scoring unit is configured to give the machining process the score based on the machining shape to be formed by the machining process, the machining shape including at least one of
  a balance of the machining shape including a proximity of the machining shape to a circle,
  a size of the machining shape, or
  a position of the machining shape on the workpiece.

2. The program generator according to claim 1, wherein the machining process scoring unit is configured to give the machining process the score based on
 the information regarding the machining process, and
 information regarding any one of a previous machining process and a machining process earlier than the previous machining process, the previous machining process and the machining process earlier than the previous machining process being determined by the machining sequence determination unit.

3. The program generator according to claim 1, further comprising:
 a machining program generation unit configured to generate a machining program based on the sequence of the machining process determined by the machining sequence determination unit.

4. The program generator according to claim 1, wherein the machining process scoring unit is configured to give the machining process the score based on a distance from the machining shape to a plurality of jigs for supporting the workpiece.

5. The program generator according to claim 1, wherein the machining process scoring unit is configured to give the machining process the score based on whether or not the machining shape crosses an intermediate line of the workpiece, the intermediate line being a line between, and equally spaced from, adjacent jigs among a plurality of jigs for supporting the workpiece.

6. The program generator according to claim 1, wherein the machining process scoring unit is configured to
 give the machining process a plurality of scores based on the machining shape to be formed by the machining process, the machining shape including
  the balance of the machining shape including the proximity of the machining shape to a circle,
  the size of the machining shape, and
  the position of the machining shape on the workpiece, and
 add the plurality of scores together to obtain a total score of the machining process.

7. The program generator according to claim 6, wherein the machining process scoring unit is configured to obtain
 a plurality of total scores of a plurality of machining processes, respectively, and
 the machining sequence determination unit is configured to determine a sequence of the plurality of machining processes based on the plurality of total scores.

* * * * *